C. G. CALLAN.
TOOTHED BAR FOR THRESHING CYLINDERS AND CONCAVES.
APPLICATION FILED APR. 22, 1910.
978,692.
Patented Dec. 13, 1910.
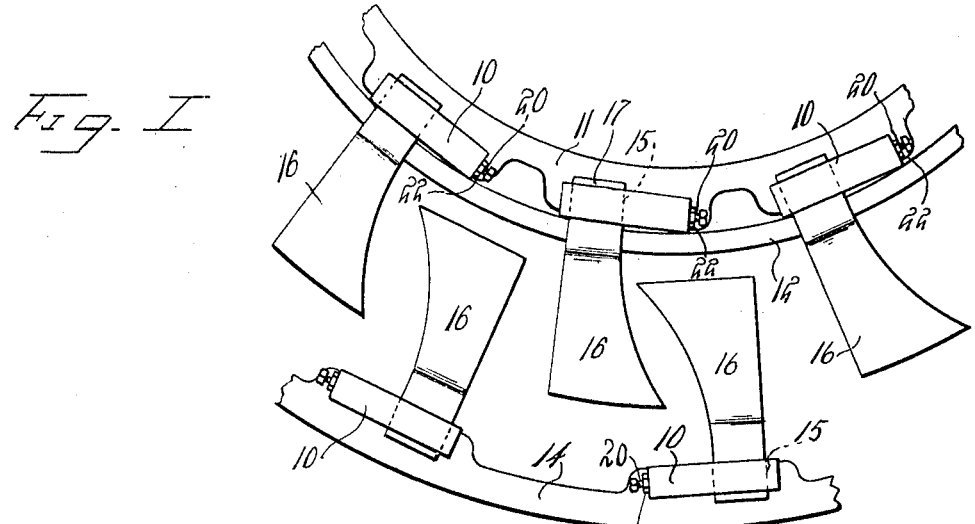
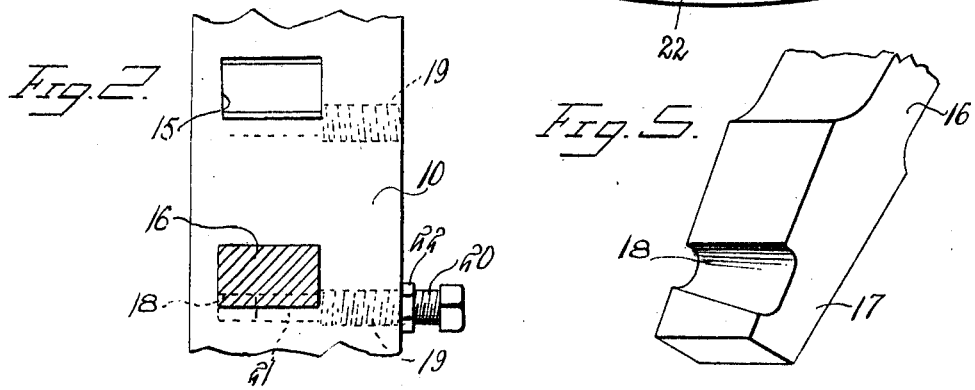
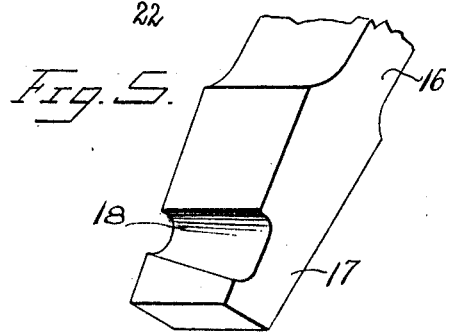
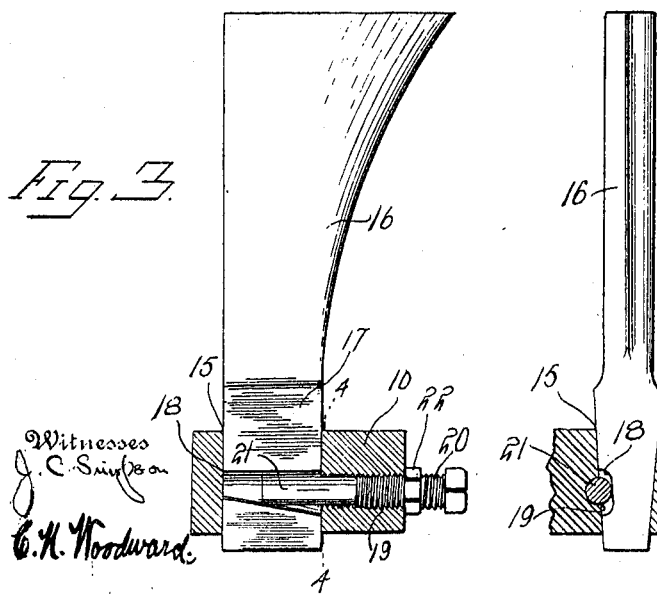
Inventor
C. G. Callan

UNITED STATES PATENT OFFICE.

CHARLES G. CALLAN, OF CHAMBERLAIN, SASKATCHEWAN, CANADA.

TOOTHED BAR FOR THRESHING CYLINDERS AND CONCAVES.

978,692.  Specification of Letters Patent.  Patented Dec. 13, 1910.

Application filed April 22, 1910. Serial No. 557,019.

*To all whom it may concern:*

Be it known that I, CHARLES G. CALLAN, a subject of the King of Great Britain, residing at Chamberlain, in the Province of Saskatchewan, Dominion of Canada, have invented certain new and useful Improvements in Toothed Bars for Threshing Cylinders and Concaves; and I do hereby declare the following to be a full, clear, and exact description of the invention, such as will enable others skilled in the art to which it appertains to make and use the same.

This invention relates to improvements in the teeth of cylinders and concaves of threshing machines, and has for one of its objects to provide an improved means for forming and fastening the butt ends of the teeth in the cylinder and "concave" bars, to not only effectually support and hold the tooth rigidly in position, but to prevent the displacement of the tooth in event of its becoming loosened.

Many serious accidents and much damage to machinery has resulted when the teeth of the cylinders or concaves of threshing machines become loosened during the threshing operations and being carried into the separating machinery, and to effectually prevent the teeth from becoming disengaged from the cylinder and concave bars in event of their becoming loosened is the principal object of the present invention, and in the drawings illustrative of the preferred embodiment of the invention, Figure 1 is an end elevation of a portion of a threshing machine cylinder and a portion of one of the concaves with a plurality of the improved teeth arranged therein, Fig. 2 is a plan view enlarged of a portion of one of the cylinder tooth bars showing one of the teeth in section connected therewith and likewise showing a portion of the bar with the teeth detached, Fig. 3 is a sectional detail, enlarged, through one of the cylinder bars with one of the improved teeth located therein. Fig. 4 is a front view of the parts shown in Fig. 3 with the tooth bar in section on the line 4—4 of Fig. 3, Fig. 5 is a perspective view enlarged of the lower portion of one of the improved teeth.

The improved device is applicable without material structural changes to the bars of threshing machine cylinders and concaves, and in the drawings is shown thus applied, the cylinder bars being indicated at 10 connected to the usual spaced bands 11 and heads 12 and the concave bars also represented at 10 and secured in the usual manner to the concave frame 14, these parts being of the usual construction. The teeth of the cylinder and of the concave are precisely alike and secured in the same manner and the description of one will suffice for all. The bars both of the cylinder and of the concave are each provided with transverse sockets, represented at 15, to receive the teeth, and these sockets are formed with their side walls tapering or converging toward the inner faces, as shown. Each of the improved teeth comprises a stock 16 of the usual form and with the butt end of each tapered or wedge-shaped to correspond to the taper of the socket, so that they may be tightened in the bars by being driven into the sockets. Each of the butt ends 17 is provided with a transverse recess 18 in one of its tapered sides, the recess being elongated and rounded at the ends and of less length at one end than at the other, so that the lower side of the recess is inclined, as shown in Fig. 3.

Formed through each of the bars 10 opposite each of the sockets and extending through the same is an aperture 19 threaded at one end. Fitting through each of the apertures 19 is a pin having a threaded portion 20, and an unthreaded portion 21, the threaded portion engaging in the threaded portion of the aperture and the unthreaded portion extending into the recess 18 and bearing at its free end against the inclined side of the recess, as shown in Fig. 3.

When the teeth are to be secured in the bars they are driven into the tapered sockets relatively firm by a hammer or other implement before the pins 20—21 are inserted. The latter are then inserted and actuated by a wrench in the usual manner to cause the free end of the unthreaded portion 21 to engage against the inclined side of the recess 18, and thus apply a downward strain to the tooth. By this means the tooth is held with a two-fold force, the converging sides of the socket, and the holding pin, as will be obvious. Each of the bolts is provided with a lock nut 22 to prevent the bolts from working loose. The threaded portion 20 may be right or left handed as may be preferred, and in practice it may be found advantageous to provide portions of the pins with right or left handed threads, but this does not affect the invention, and the pins may be right and left handed as may be preferred. By this simple arrangement it will be obvious that the teeth may be readily tightened in the tooth bars in event of their working loose, by applying a wrench to the threaded pins, as above described.

The improved device is simple in construction, can be readily applied without structural changes to threshing cylinders and concaves of various sizes and constructions, and is likewise applicable to teeth of various forms and sizes.

What is claimed is:—

1. A bar for threshing machine cylinders or concaves having a plurality of transverse sockets with a recess in one of the sides of each socket, and having a threaded aperture in alinement with the longitudinal plane of the socket recess and communicating with the same, a tooth for each of said recesses and engaging respectively in said sockets, each of said teeth having a transverse recess in one side communicating with the recess of the socket and with one side inclined, and a pin having a portion threaded for engaging in the threaded aperture of the bar with the unthreaded portion of the pin extending into the recess of the bar and also into the recess of the tooth and engaging against the inclined side of the same.

2. A bar for threshing machine cylinders or concaves having a plurality of transverse sockets with their sides converging inwardly and with a recess in one of the converging sides of each socket, and having a threaded aperture in alinement with the longitudinal plane of the socket recess and communicating with the same, a tooth for each of said sockets and having a tapered terminal corresponding to and engaging respectively in the same, each of said teeth having a transverse recess in one side communicating with the recess of the socket and with one side inclined, and a pin having a portion threaded for engaging in the threaded aperture of the bar with the unthreaded portion of the pin extending into the recess of the bar and also into the recess of the tooth and engaging against the inclined side of the same.

In testimony whereof, I affix my signature, in presence of witnesses.

CHARLES G. CALLAN.

Witnesses:
  J. M. HANBIDGE,
  G. E. CONWORTH,
  J. A. CROSS.